US011411885B2

(12) United States Patent
Brouwer et al.

(10) Patent No.: US 11,411,885 B2
(45) Date of Patent: *Aug. 9, 2022

(54) NETWORK-ACCESSIBLE DATA VOLUME MODIFICATION

(71) Applicant: Amazon Technologies, Inc., Seattle, WA (US)

(72) Inventors: Pieter Kristian Brouwer, Issaquah, WA (US); Marc Stephen Olson, Bellevue, WA (US); Nachiappan Arumugam, Seattle, WA (US); Michael Thacker, Seattle, WA (US); Vijay Prasanth Rajavenkateswaran, Bellevue, WA (US); Arpit Tripathi, Bellevue, WA (US); Danny Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,580

(22) Filed: Oct. 22, 2019

(65) Prior Publication Data
US 2020/0053022 A1 Feb. 13, 2020

Related U.S. Application Data

(63) Continuation of application No. 15/197,557, filed on Jun. 29, 2016, now Pat. No. 10,469,405.

(51) Int. Cl.
H04L 47/80 (2022.01)
(52) U.S. Cl.
CPC .................. H04L 47/801 (2013.01)
(58) Field of Classification Search
CPC ..................... H04L 47/801; H04L 47/821
See application file for complete search history.

(56) References Cited

U.S. PATENT DOCUMENTS 4,620,279 A * 10/1986 Read ..................... G06F 13/122
710/22
6,654,830 B1 11/2003 Taylor et al.
(Continued)

FOREIGN PATENT DOCUMENTS

EP 0926585 6/1999
JP 3266231 3/2002

OTHER PUBLICATIONS

International Search Report and Written Opinion for International Application No. PCT/US2017/039793, dated Oct. 10, 2017.
(Continued)

Primary Examiner — Hamza N Algibhah
Assistant Examiner — James Ross Hollister
(74) Attorney, Agent, or Firm — Knobbe Martens Olson & Bear LLP

(57) ABSTRACT

A user can set or modify operational parameters of a data volume stored on a network-accessible storage device in a data center. For example, the user may be provided access to a data volume and may request a modification to the operational parameters of the data volume. Instead of modifying the existing data volume, the data center can provision a new data volume and migrate data stored on the existing data volume to the new data volume. While the data migration takes place, the existing data volume may block input/output (I/O) requests and the new data volume may handle such requests instead. Once the data migration is complete, the data center may deallocate the data blocks of the existing data volume such that the data blocks can be reused by other data volumes.

20 Claims, 8 Drawing Sheets

(56) References Cited

U.S. PATENT DOCUMENTS

| | | | |
|---|---|---|---|
| 7,536,503 B1 | 5/2009 | Venkatanarayanan et al. | |
| 7,761,684 B2 | 7/2010 | Eguchi | |
| 7,917,722 B2 | 3/2011 | Yamamoto et al. | |
| 7,966,470 B2 | 6/2011 | Sakurai et al. | |
| 8,479,211 B1* | 7/2013 | Marshall | G06F 16/134 718/104 |
| 8,677,089 B2 | 3/2014 | Takahashi et al. | |
| 8,799,414 B2 | 8/2014 | Taylor et al. | |
| 8,959,182 B1 | 2/2015 | Anderson et al. | |
| 8,984,243 B1* | 3/2015 | Chen | G06F 3/0631 711/162 |
| 9,329,795 B2 | 5/2016 | Satoyama et al. | |
| 9,417,968 B2 | 8/2016 | Dornemann et al. | |
| 9,537,938 B2 | 1/2017 | Thomas et al. | |
| 9,805,070 B2 | 10/2017 | Buehne et al. | |
| 10,169,068 B2* | 1/2019 | Brouwer | G06F 9/5088 |
| 2008/0072003 A1* | 3/2008 | Vu | G06F 3/067 711/162 |
| 2012/0137097 A1* | 5/2012 | Slater | G06F 11/1451 711/162 |
| 2014/0310458 A1* | 10/2014 | Xiao | G06F 3/065 711/114 |
| 2014/0358854 A1* | 12/2014 | Tabenkin | G06F 16/119 707/620 |
| 2015/0234618 A1* | 8/2015 | Miwa | G06F 3/0608 711/165 |
| 2015/0278024 A1* | 10/2015 | Barman | G06F 11/1466 707/634 |
| 2015/0378626 A1 | 12/2015 | Motwani et al. | |
| 2017/0034064 A1* | 2/2017 | Everhart | H04L 47/25 |
| 2017/0192866 A1* | 7/2017 | Vijayan | G06F 16/178 |

OTHER PUBLICATIONS

"COPY Examples—Amazon Redshift", https://docs.aws.amazon.com/redshift/latest/dg/r_COPY_command_examples.html#copy-command-examples-manifest. Captured on Oct. 31, 2014 (Year: 2014).

* cited by examiner

NETWORK-ACCESSIBLE DATA VOLUME MODIFICATION

CROSS REFERENCE TO RELATED APPLICATIONS

This application is a continuation of U.S. patent application Ser. No. 15/197,557, entitled "NETWORK-ACCESSIBLE DATA VOLUME MODIFICATION" and filed on Jun. 29, 2016, the entire disclosure of which is hereby incorporated by reference herein.

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computer machines to a connected computer user. With virtualization, a single physical computing device can create, maintain, or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, multiple users can share access to resources. For example, a first and a second user can have access to network-based data repositories provided by a network service provider. In such applications, the network service provider can experience concurrent commands to execute on the shared resources.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
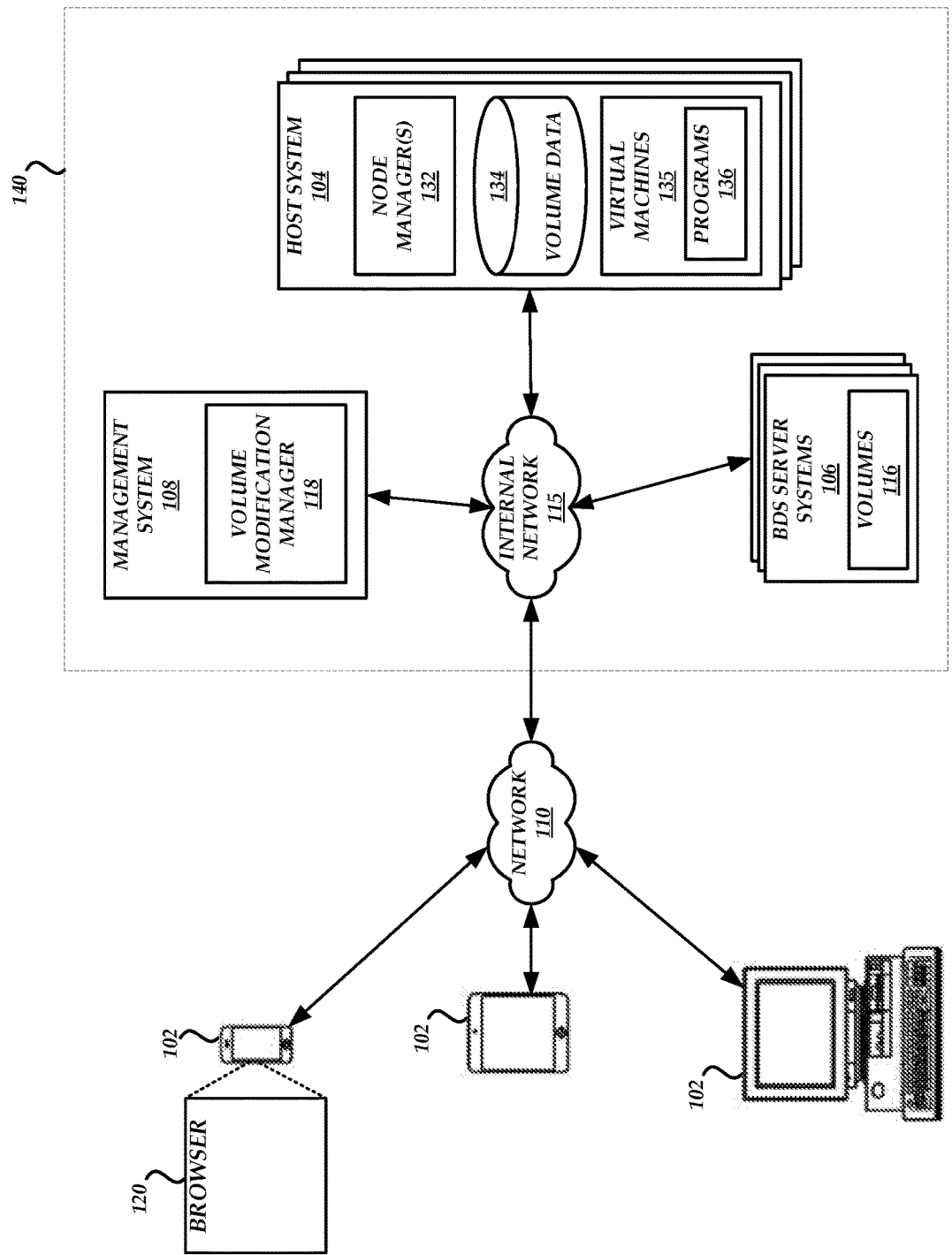
FIG. 1 is a block diagram of a data volume modification environment that includes a data center and user devices, according to one embodiment.

As described above, in some environments, multiple users can access shared network-hosted resources provided by a network service provider. Problems can arise, however, when a user desires to modify operational parameters, such as capacity, throughput, size, storage type, bandwidth, etc., associated with the user's allocation of the shared network-hosted resources. By way of an illustrative example, a specific user storage need exceeds the user's allocated storage capacity on a shared network-hosted storage device. To address the need for additional network-hosted storage, the network service provider can provide a user with the ability to request additional storage (e.g., new volumes to supply the user's need) or to self-administer the migration of data from an existing data volume to a different data volume.

In some scenarios, the allocation of additional network-hosted storage can result in additional complexity to user application logic. For example, a user application can create a large data file that exceeds the user's allocated storage capacity. Because the data file cannot be stored, the user adds additional data volumes to increase the user's allocated storage capacity. The data file can be partitioned into smaller data segments and the smaller data segments are then distributed across the current and additional data volumes. However, this increases the complexity of the application logic given that additional data overhead is required to keep track of the distributed data segments. In other scenarios, the allocation of additional network-hosted storage can result in increased latency. For example, with the addition of additional data volumes, user data is stored across multiple data volumes. When a read or write request is received, the network service provider accesses one or more of the data volumes to process the request. However, accessing multiple data volumes can increase the request processing time.

Generally described, various embodiments disclosed herein enable a user to set or modify operational parameters of one or more data volumes stored on network-hosted storage devices and provisioned to the user. For example, an operational parameter can include a storage capacity, a data storage type (e.g., hard disk drive (HDD), solid state device (SSD), Flash memory, hybrid storage devices, etc.), a level of expected performance (e.g., rate of input/output operations per second (IOPS), throughput, bandwidth, etc.), a geographical location, or the like. The user, via a user device, can generate a request to modify one or more operational parameters. The request can be transmitted by the user device to a data center over a network, where the data center includes data repositories and systems that manage the data repositories.

The data center can process the request to identify the requested operational parameter modifications. In one approach, the data center directs an additional data volume to be provisioned in another data repository to supplement the existing data volume provisioned to the user. The additional data volume is provisioned such that the characteristics of the combination of the two data volumes satisfy the requested operational parameter modifications. However, as described above, provisioning a supplemental data volume can increase the latency of read or write requests.

Thus, as described herein, the data center instead provisions a new data volume on the same data repository or on a different data repository as the original data volume. The characteristics of the new data volume alone satisfy the requested operational parameter modifications. Once the new data volume is provisioned, any read or write requests to the old data volume are blocked and the new data volume is instructed to handle such requests. As the new data volume begins to handle read or write requests, the old data volume migrates data stored in the old data volume to the new data volume. If a read request is received by the new data volume for data that has yet to be transferred from the old data volume to the new data volume, then the new data volume prioritizes the transfer of such data from the old data volume such that the read request can be processed. Once the data migration is complete, data blocks associated with the old data volume are deallocated for future use by other data volumes. Additional details on the operations performed by the different components of the data center to process a request to modify operational parameters of a user's data volume are described below with respect to FIGS. 1-6.

Example Data Volume Modification Environment

FIG. 1 is a block diagram of a data volume modification environment that includes a data center 140 and user devices 102, according to one embodiment. As illustrated in FIG. 1, the data center 140 includes host systems 104, a pool of block data storage (BDS) server systems 106, and a management system 108. In an embodiment, the data center 140 includes one or more of the host systems 104.

The host systems 104 are configured to manage the execution of virtual machines 135. For example, each virtual machine 135 can act as an independent computing node for executing one or more programs 136 (e.g., document applications, account management applications, etc.) as instructed by a user via the user device 102. The host systems 104 can include one or more node managers 132 that execute in memory of the host system 104 such that the node managers 132 manage the virtual machines 135. The executing node manager 132 and virtual machines 135 can execute as distinct processes on an operating system executed on the host system 104.

Illustratively, a node manager 132 may store information about the current volumes 116 attached to the host system 104 or used by the virtual machines 135 (e.g., the programs 136) executing on the host system 104 in volume data store 134. For example, the information can include the storage capacity of a volume 116, the amount of storage available in the volume 116, a data storage type of the volume 116 (e.g., HDD, SSD, Flash memory, hybrid storage devices, etc.), a level of performance of the volume 116 (e.g., rate of IOPS, throughput, bandwidth, etc.), a geographical location of the volume 116, or the like. Having volume data store 134 on the host system 104 is illustrative. Volume data store 134 could reside on a variety of systems or components within the data center 140, including for example BDS server systems 106 or management system 108.

The pool of BDS server systems 106 can each include one or more storage devices (e.g., HDDs, SSDs, hybrid storage devices, etc.) that provide local block storage. The pool of BDS server systems 106 are configured to control and provide reliable non-local block data storage to the executing programs 136. For example, the BDS server systems 106 can include local block storage for use in storing one or more volumes 116. The programs 136 executed by the virtual machines 135 may have access to the volumes 116 via internal network 115, which is a network internal to the data center 140. The internal network 115 may include various networking devices (e.g., routers, switches, gateways, etc.) that are not shown. The internal network 115 may be further coupled to an external network, such as the network 110. Multiple remote archival storage systems (not shown) external to the data center 140 may also be used to store additional volumes accessible by the programs 136 executed by the virtual machines 135 via the internal network 115 or the network 110.

In an embodiment, a user is able to access the volumes 116 stored on the local block storage of the BDS server systems 106 through the virtual machines 135, for example via the user device 102, as if those volumes 116 are stored on block storage devices local to the virtual machine 135. Since the volumes 116 function as if each volume 116 is a hard drive or similar block device local to the virtual machine 135, the volumes 116 can be addressed with offsets, lengths, and other such conventional block device aspects. This allows the user device 102 to interact with the virtual machine 135 as if the volume 116 was a local hard drive or block device. Furthermore, the BDS server systems 106 can provide "read after write" consistency, where data is guaranteed to be able to be read from a volume 116 as soon as the data is written to the volume 116. Thus, the BDS server systems 106 can provide relatively low latency, such as latencies less than about ten milliseconds.

The management system 108 may be one or more server computers that are configured to manage components and systems in the data center 140. For example, the management system 108 may provide a variety of services related to providing non-local block data storage functionality, including the management of user accounts (e.g., creation, deletion, billing, etc.); the creation, use, and deletion of volumes 116 or snapshot copies of those volumes 116; the collection or processing of performance or auditing data related to the use of volumes 116 or snapshot copies of those volumes 116; the obtaining of payment from users for the use of the volumes 116 or snapshot copies of those volumes 116; or the like. The management system 108 can coordinate with the node managers 132 to manage the use of the volumes 116 by the programs 136 executed by the virtual machines 135. Alternatively, the management system 108 or the node managers 132 can independently manage the use of the volumes 116 by the programs 136 executed by the virtual machines 135. The management system 108 can maintain a database that includes information about the volumes 116. While the management system 108 is illustrated in FIG. 1 as being a separate, centralized system within the data center 140, this is not meant to be limiting. The functionality of the management system 108 can in part or in whole be carried out by one or more of the host systems 104 or the BDS server systems 106.

In an embodiment, the management system 108 includes a volume modification manager 118 that is configured to control the creation, use, and deletion of the volumes 116. For example, a user via the user device 102 can generate and send a request (e.g., an application programming interface (API) call, a web service call, etc.) to the volume modification manager 118 to provision a new data volume (which can then be attached to a program 136 associated with the user), to delete an existing data volume, or to modify an existing data volume.

The management system 108 can be thought of as residing in a control plane, or control environment, with the data volumes 116 and block storage devices of the BDS server systems 106 residing in a separate data plane, or data environment. In one example, an initial volume 116 may be provisioned to a user. The user can send, via the user device 102, a "ModifyVolume" API call to the volume modification manager 118. The "ModifyVolume" API call can include an identification of the volume 116 to modify (e.g., the initial volume 116), an identification of one or more operational parameters of the volume 116 to modify, and information identifying how the one or more operational parameters should be modified (e.g., a new amount of storage to be allocated, a new level of performance, etc.). Alternatively, instead of identifying the amount by which an operational parameter should be modified, the API call can include information identifying the desired values for one or more operational parameters. The API call can be sent while the initial volume 116 is still in use (e.g., a program 136 is running that uses the initial volume 116).

In response to receiving the API call, the volume modification manager 118 can instruct the BDS server systems 106 to provision a new volume 116 based on the operational parameters of the initial volume 116 or the operational parameter modifications identified in the API call. Thus, the BDS server systems 106 may not be instructed to modify the initial volume 116. For example, the storage capacity of the initial volume 116 may be 1 TB and the level of performance may be 100 IOPS or 1 MB/s. The operational parameter modifications identified in the API call may be to modify the storage capacity by 1 TB and to modify the level of performance by 1,900 IOPS or 99 MB/s (such that the storage capacity becomes 2 TB and the level of performance becomes 2,000 IOPS or 100 MB/s). Alternatively, the volume modification manager 118 can instruct the BDS server systems 106 to provision a new volume 116 based on the operational parameters identified in the API call (e.g., where the API call indicates that the new storage capacity should be 2 TB and the new level of performance should be 2,000 IOPS or 100 MB/s). The new volume 116 can be provisioned on a single storage device in the BDS server systems 106 or on multiple storage devices in the BDS server systems 106.

In response to receiving the API call or in response to receiving an indication from the BDS server system 106 that the new volume 116 is ready to start receiving input/output (I/O) requests (e.g., read requests, write requests, backup requests, etc.), the volume modification manager 118 can also prevent any future I/O requests from being transferred to the initial volume 116 or instruct the initial volume 116 to block any future I/O requests. In alternate embodiments, the host system 104 (e.g., the node manager 132 or the virtual machine 135) can receive an indication that the new volume 116 is ready and instruct the initial volume 116 to block any future I/O requests or the new volume 116 can directly instruct the initial volume 116 to block any future I/O requests. For example, an EBS client (e.g., the virtual machine 135) reads from or writes to the BDS server systems 106 via a block device driver. When the virtual machine 135 learns that the new volume 116 is replacing the initial volume 116 and that the new volume 116 is provisioned or ready, this information is passed to the block device driver, which instructs the initial volume 116 to stop handling any future I/O requests.

The volume modification manager 118 (directly or via the EBS client) can also instruct the initial volume 116 to execute any remaining I/O requests remaining in an I/O queue. For example, read or write requests received from a program 136 may be stored in an I/O queue associated with a volume 116 for execution by the BDS server systems 106 on the appropriate volume 116. Before receiving the API call from the user device 102, the program 136 may have transmitted a write request that is stored in the I/O queue and that has not yet been executed. Thus, the volume modification manager 118 (directly or via the EBS client) can instruct the BDS server systems 106 to execute any requests in the I/O queue so that all requests submitted prior to the transmission of the API call are complete. This may help ensure that no data is lost during the transition from the initial volume 116 to the new volume 116.

In an embodiment, each of the volumes 116 is associated with a volume manifest file. The volume manifest file may identify locations in the associated volume 116 (e.g., offsets in the associated volume 116) in which data chunks have been stored. The volume manifest file may not include entries for locations in the associated volume 116 in which no data is written (e.g., the locations include logical 0s). The volume modification manager 118 can instruct the initial volume 116 to transfer its volume manifest file to the new volume 116 after receiving an indication that the I/O queue of the initial volume 116 is empty. Thus, all write requests may be performed before the volume manifest file is transferred, thereby ensuring that the transferred volume manifest file has a complete list of data chunk locations (and ensuring that data written to the new volume 116 does not overwrite data that was written to the initial volume 116, as described in greater detail below).

The new volume 116 can use the volume manifest file of the initial volume 116 to identify offsets in the initial volume 116 in which data chunks are stored and request the transfer of all such data chunks to the new volume 116. The retrieval of the data chunks may be queued such that one or more data chunks are requested at a time. The data chunk migration may occur in the background (e.g. in a background process) while the new volume 116 is operational and receiving read or write requests. The volume modification manager 118 can periodically poll the new volume 116 to determine a status of the data chunk migration. In alternate embodiments, the new volume 116 can pull data chunks from a volume that is a slave or mirror of the initial volume 116 (e.g., a backup volume) if the initial volume 116 is busy. In some cases, the number of partitions in the initial volume 116 is different than the number of partitions in the new volume 116 (e.g., because the two volumes 116 have a different storage capacity, because a different number of partitions is requested in the API call, etc.). The new volume 116 may implement a data transfer technique to identify which partition a data chunk is stored in in the initial volume 116 and which partition the data chunk should be stored in in the new volume 116, as described in greater detail below.

Before or after instructing the initial volume 116 to transfer its volume manifest file to the new volume 116, but after receiving an indication that the I/O queue of the initial volume 116 is empty, the volume modification manager 118 (or the host system 104, such as the EBS client) can instruct the new volume 116 to receive and process any future I/O requests received from the program 136. Alternatively, the volume modification manager 118 can instruct the host system 104, such as the EBS client, to send future I/O requests to the new volume 116. The new volume 116 can use the volume manifest file of the initial volume 116 to determine whether an offset already includes a written data chunk if a write request is received or to determine an appropriate offset for storing the new data chunk. If a read request is received, the new volume 116 can determine whether the data chunk corresponding to the offset identified in the read request is present in the new volume 116. For example, the new volume 116 can check a status of the data chunk migration to determine whether the data chunk corresponding to the received offset has been transferred. If the data chunk is stored in the new volume 116, the new volume 116 can process the read request by retrieving the data chunk from the new volume 116. If the data chunk is not stored in the new volume 116, the new volume 116 can instruct the initial volume 116 to prioritize the transfer of the data chunk corresponding to the received offset (e.g., put the data chunk at the top of the data chunk retrieval queue). Thus, if the initial volume 116 is transferring a first data chunk and the received offset corresponds to a second data chunk, the initial volume 116 can pause the transfer of the first data chunk and instead begin the transfer of the second data chunk. The transfer of the second data chunk can occur at a faster rate than the transfer of the first data chunk (e.g., the first data chunk may be transferred via a background operation where a limited amount of resources are devoted to the transfer, whereas the second data chunk may be transferred in a prioritized manner where a larger amount of resources are devoted to the transfer to speed up the transfer process). Once the second data chunk is transferred, then the initial volume 116 can resume the transfer of the first data chunk. Alternatively, while the first data chunk is being transferred to the new volume 116, the initial volume 116 can establish another connection with the new volume 116 and transfer the second data chunk via the newly established connection simultaneously with the transfer of the first data chunk. If bandwidth is limited, the initial volume 116 or the new volume 116 can allocate more resources to the newly established connection than to the already existing connection to speed up the transfer of the second data chunk. In some situations, the initial volume 116 may be transferring the second data chunk when the write request is received by the new volume 116. Because the new volume 116 may not be able to determine when the transfer will be complete, the new volume 116 may still request the second data chunk be transferred in a prioritized fashion via the newly established connection or by pausing the background transfer.

As described above, the volume modification manager 118 can periodically poll the new volume 116 to determine a status of the data chunk migration. Specifically, the volume modification manager 118 individually polls each partition in the new volume 116 to determine the status. Once the new volume 116 indicates that the data chunk migration is complete (e.g., each individual partition in the new volume 116 indicates that its portion of the data chunk migration is complete), the volume modification manager 118 can instruct the BDS server systems 106 to deallocate a portion of the BDS server systems 106 provisioned to the initial volume 116, thereby deleting data from the initial volume 116. For example, the BDS server systems 106 can delete the initial volume 116 geometry (e.g., the number of partitions, the characteristics of the partitions, the unique IDs of the partitions, performance characteristics, how data is split across partitions, etc.) and delete data from the data blocks in the initial volume 116 so that the data blocks can be freed for use by other volumes 116.

Some conventional systems implement a volume modification procedure using a provisioned slave or mirror volume that includes data identical to the initial volume. For example, the conventional systems can provision a new volume and then migrate data from the slave or mirror volume to the new volume. While the data migration is in progress, the initial volume remains as the active volume and handles I/O requests. As write requests are received, the write requests can be performed on the initial volume and the slave or mirror volume such that no data is lost. Once the data migration is complete, then the new volume becomes the active volume. However, a slave or mirror volume must be in consistent state with the master volume so that the slave or mirror volume can take the place of the master volume if the master volume fails. The new volume 116 described herein, however, is not in a consistent state with the initial volume 116 (e.g., after being provisioned and before data chunk migration is complete, the new volume 116 receives I/O requests not received by the initial volume 116). Thus, the new volume 116 described herein is not the same as a slave or mirror volume used in conventional systems.

The host systems 104 and the management systems 108 may each include one or more processors, memory that stores instructions executed by the one or more processors, network interfaces, application-specific hardware, or other hardware components that allow the systems to perform the functionality described herein. The BDS server systems 106 may include one or more processors, memory that stores instructions executed by the one or more processors, network interfaces, data storage devices (e.g., HDDs, SSDs, Flash memory, hybrid storage devices, etc. that can store the volumes 116), application-specific hardware, or other hardware components that allow the BDS server systems 106 to perform the functionality described herein.

While a single data center 140 is illustrated in FIG. 1, this is not meant to be limiting. The data volume modification environment may include any number of data centers, where the multiple data centers can be coupled via the network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to or from the Internet.

It will be appreciated that the example of FIG. 1 has been simplified for the purposes of explanation, and that the number and organization of components in the data center 140 may be much larger than what is depicted in FIG. 1. For example, as one illustrative embodiment, there may be approximately 4,000 computing systems per data center 140, with some of those computing systems being host systems 104 that may each host fifteen virtual machines or with some of those computing systems being BDS server systems 106 that may each store several volumes 116. If each hosted virtual machine executes a copy of one program 136, then such a data center 140 may execute as many as sixty thousand program 136 copies at one time. Furthermore, hundreds or thousands (or more) volumes 116 may be stored on the BDS server systems 106, depending on the number and storage capacity of BDS server systems 106 or the size of the volumes 116. It will be appreciated that in other embodiments, other numbers of computing systems, virtual machines 135, programs 136, or volumes 116 may be used. Additional details of the data center 140 are described in U.S. Pat. No. 8,984,243, which is hereby incorporated by reference herein in its entirety.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute the browser application 120 to communicate via the network 110 with other computing systems, such as the data center 140, in order to transmit requests (e.g., API calls, such as "ModifyVolume").

Example Block Diagram for Modifying a Data Volume

Figure 2:
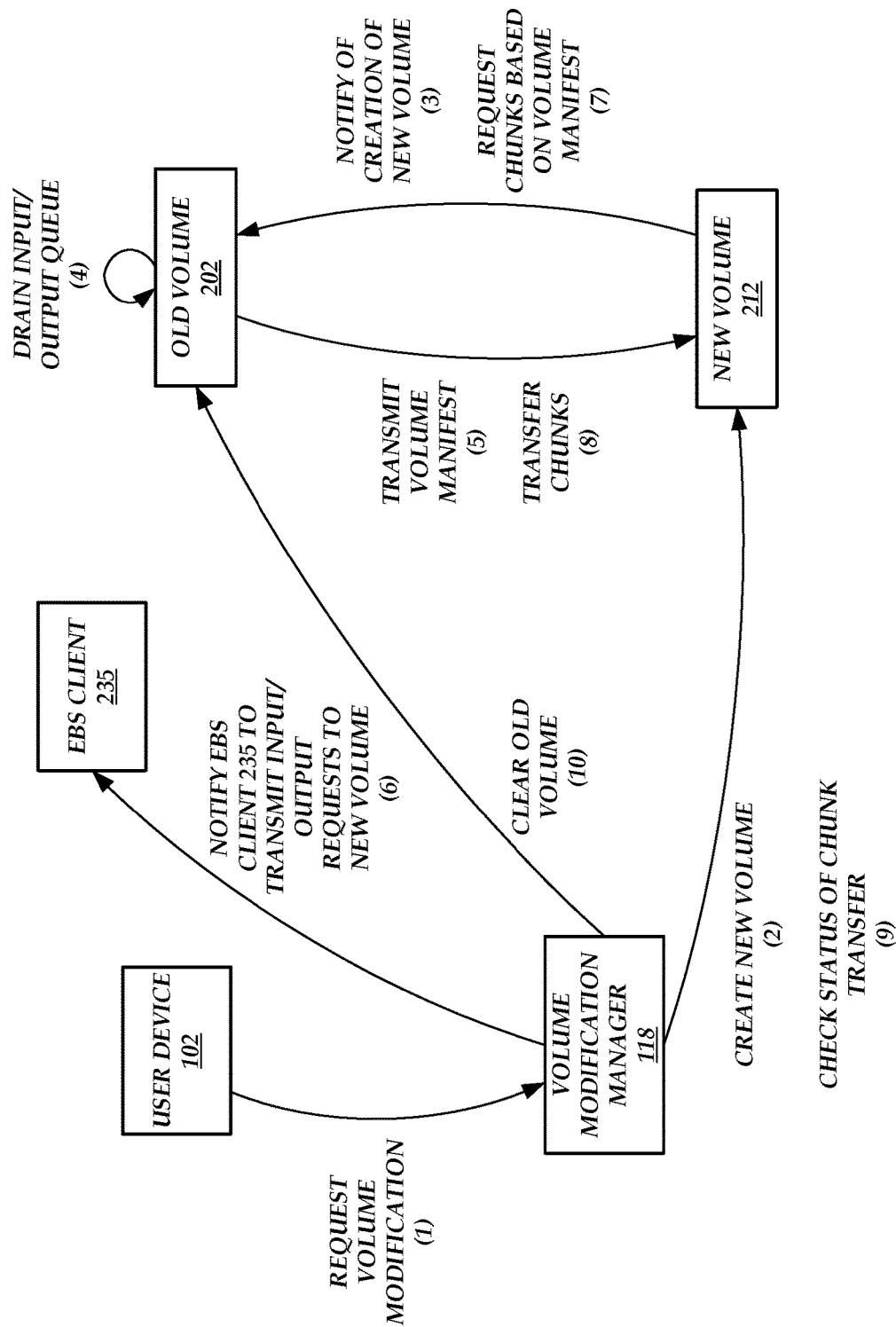
FIG. 2 is a block diagram of the data volume modification environment of FIG. 1 illustrating the operations performed by the components of the data volume modification environment to modify a data volume, according to one embodiment.

FIG. 2 is a block diagram of the data volume modification environment of FIG. 1 illustrating the operations performed by the components of the data volume modification environment to modify a data volume, according to one embodiment. As illustrated in FIG. 2, the user device 102 may request the modification of a volume 202 provisioned to the user of the user device 102 at (1). For example, the request can include an identification of the volume 202 to modify, an identification of one or more operational parameters of the volume 202 to modify, or information identifying how the one or more operational parameters should be modified (e.g., a new amount of storage to be allocated, a new level of performance, etc.). Alternatively, instead of identifying the amount by which an operational parameter should be modified, the request can include information identifying the desired values for one or more operational parameters.

The request can be transmitted to the volume modification manager 118. The volume modification manager 118 can create a new volume 212 at (2) by instructing the BDS server systems 106 to allocate data blocks in one or more storage devices. The new volume 212 can then notify the now old volume 202 that a new volume 212 is created at (3). Notification that a new volume 212 is created may cause the old volume 202 to drain its I/O queue at (4) by executing any requests stored therein. Once the I/O queue is drained, the old volume 202 may transfer the volume manifest file of the old volume 202 at (5) to the new volume 212.

The volume modification manager 118 can also notify an EBS client 235 to transmit I/O requests to the new volume 212 at (6). The EBS client 235 is a virtual machine 135 that reads from or writes to the BDS server systems 106 via a block device driver. When the virtual machine 135 learns about the presence of the new volume 212 and that the new volume 212 is replacing the old volume 202, this information is passed to the block device driver, which allows the virtual machine 135 to interface with the BDS server systems 106 and the new volume 212.

Using the volume manifest file, the new volume 212 can request data chunks from the old volume 202 at (7). For example, the volume manifest file can include offsets in the old volume 202 where data chunks are located. As described herein, the old volume 202 may include a plurality of partitions. When writing data to disk, each successive data chunk may be written to the next partition in line before wrapping back to the first partition once a data chunk has been written to the last partition. As an example, if the old volume 202 includes three partitions, then a first data chunk may be written to the first partition, a second data chunk may be written to the second partition, a third data chunk may be written to the third partition, a fourth data chunk may be written to the first partition, and so on. The offsets in the volume manifest file, however, may be sequential regardless of the partition. Thus, if data chunks are 8 bits long, offset 0 may correspond to a first data chunk slot in the first partition (e.g., where the first data chunk is stored), offset 8 may correspond to a first data chunk slot in the second partition (e.g., where the second data chunk is stored), offset 16 may correspond to a first data chunk slot in the third partition (e.g., where the third data chunk is stored), offset 24 may correspond to a second data chunk slot in the first partition (e.g., where the fourth data chunk is stored), and so on.

Accordingly, the new volume 212 can select an offset in the volume manifest file and use the offset, an indication of a size of a data chunk in the old volume 202 (e.g., the size of the data chunk corresponding to the selected offset), and an indication of a number of partitions in the old volume 202 to identify a location of a data chunk to retrieve that corresponds with the selected offset. For example, the new volume 212 can divide the selected offset by the size of a data chunk in the old volume 202 to determine a normalized offset. The new volume 212 can then determine the normalized offset modulo a number of partitions in the old volume 202 to identify which partition stores the data chunk associated with the selected offset. The new volume 212 can also divide the normalized offset by the number of partitions in the old volume 202 to identify which data chunk slot in the identified partition stores the data chunk associated with the selected offset. Thus, the new volume 212 can determine the location of the data chunk associated with the selected offset and request the appropriate data.

Furthermore, as described above, the new volume 212 may have a different number of partitions than the old volume 202. Thus, while a requested data chunk may be stored in a first partition in the old volume 202, this does not necessarily mean that the requested data chunk should also be stored in the first partition of the new volume 212 given the fact that successive data chunks are stored in successive partitions. Accordingly, the new volume 212 can determine the normalized offset modulo a number of partitions in the new volume 212 to identify which partition in the new volume 212 should store the data chunk associated with the selected offset. The new volume 212 can also divide the normalized offset by the number of partitions in the new volume 212 to identify which data chunk slot in the identified partition should store the data chunk associated with the selected offset. Thus, the new volume 212 can determine the location in the new volume 212 where the requested data chunk should be stored.

Upon receiving the request for one or more data chunks, the old volume 202 can begin transferring the data chunks to the new volume 212 at (8). The transfer may occur via a background process so that the new volume 212 can simultaneously process new I/O requests. The transfer can occur via a single connection or multiple connections (e.g., if the retrieval of a data chunk is prioritized based on receiving a read request for a data chunk not yet stored in the new volume 212 while the data chunk transfer is ongoing).

The volume modification manager 118 may periodically check the status of the data chunk transfer at (9). For example, the partitions of the new volume 212 may each track the progress of data chunks that are to be stored therein, and the volume modification manager 118 can poll each partition individually. Once each partition indicates that its portion of the data chunk transfer is complete, then the volume modification manager 118 may determine that the entire data chunk transfer is complete. Based on this determination, the volume modification manager 118 can transmit an instruction to the BDS server systems 106 to clear the old volume at (10). For example, the BDS server systems 106 can deallocate data blocks originally provisioned to the old volume 202 for use by other volumes (or deleting any data stored therein).

Example State Diagram for Prioritizing a Data Chunk

Figure 3:
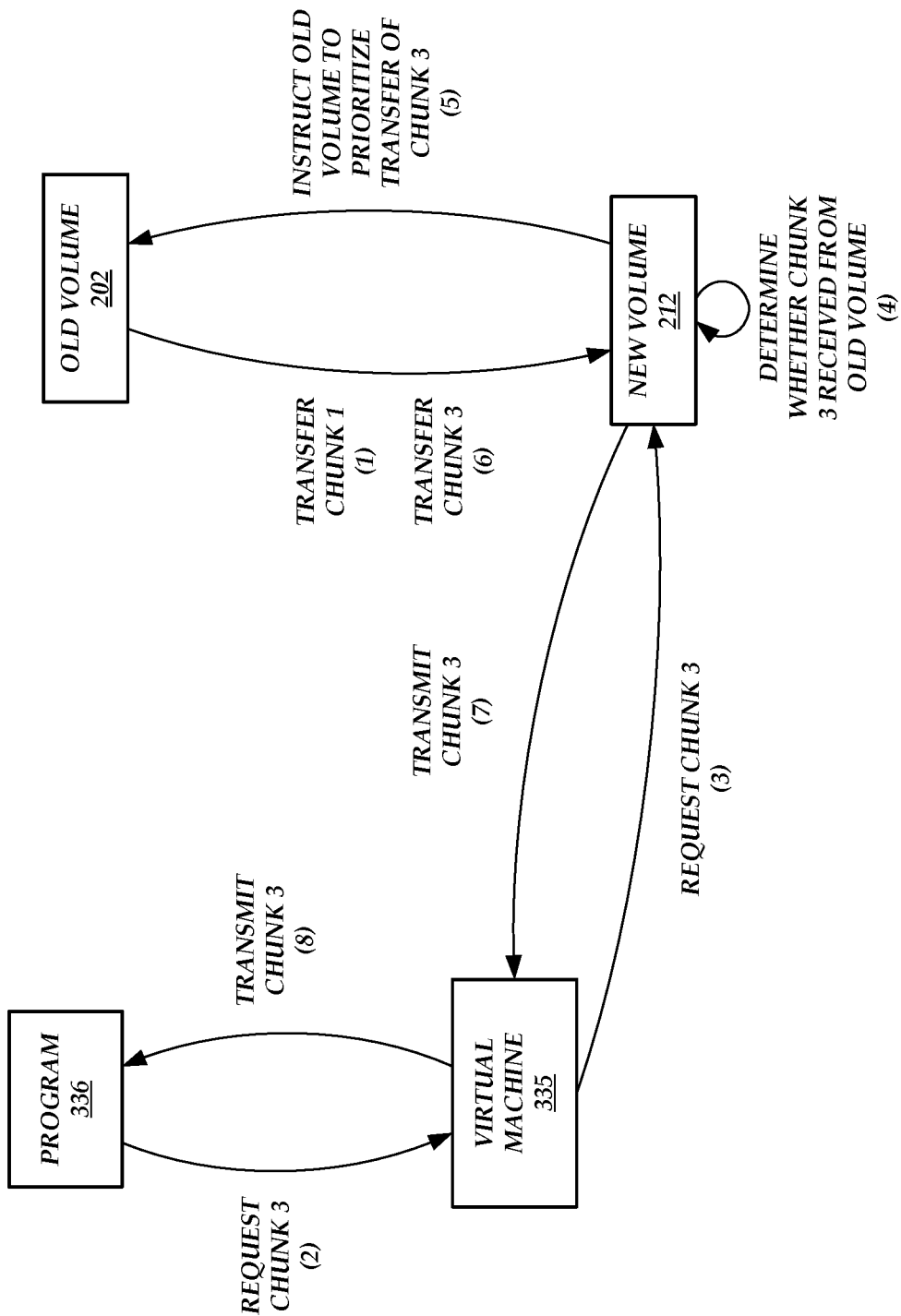
FIG. 3 is a block diagram of the data volume modification environment of FIG. 1 illustrating the operations performed by the components of the data volume modification environment to modify a data volume, according to one embodiment.

FIG. 3 is a block diagram of the data volume modification environment of FIG. 1 illustrating the operations performed by the components of the data volume modification environment to prioritize the transfer of a data chunk, according to one embodiment. As illustrated in FIG. 3, the old volume 202 may be in the process of migrating data chunks to the new volume 212. For example, the old volume 202 is currently transferring data chunk 1 at (1). The old volume 202, however, has not yet transferred data chunk 2, data chunk 3, and so on to the new volume 212.

A program 336 may submit a read request, requesting data chunk 3 at (2). The read request may be sent to a virtual machine 335 executing the program 336, a node manager 132 (not shown), or the new volume 212. If received by the virtual machine 335, the request for data chunk 3 is forwarded to the new volume 212 at (3).

The new volume 212 determines whether the data chunk 3 has been received from the old volume at (4). For example, the read request may include an offset and a size (e.g., in bytes) of the data chunk that is to be read starting at the offset (e.g., data chunk 3). The new volume 212 can use the offset and data chunk 3 size to determine which partition should store the data chunk, using the process described above. The new volume 212 can then poll the determined partition to determine a status of the transfer of the data chunk 3 (e.g., whether the transfer has started, is in progress, has completed, etc.). If the partition indicates that the transfer is complete, then the new volume 212 can retrieve the data chunk 3 and transmit to the program 336. However, as illustrated in FIG. 3, the transfer of the data chunk 3 is not complete. Thus, the new volume 212 instructs the old volume 202 to prioritize the transfer of data chunk 3 at (5).

As described above, prioritizing the transfer of a data chunk can include pausing an existing transfer and immediately beginning the transfer of the requested data chunk. Prioritizing can also include simultaneously transferring the request data chunk while the existing data chunk migration continues. In some cases, prioritizing can include simultaneously transferring the requested data chunk while the same data chunk is being transferred in the existing data chunk migration. The prioritized transfer of the data chunk can include the allocation of additional resources to the transfer so that the transfer occurs at a faster rate than the rate used to migrate data chunks in the background process.

In response to receiving the instruction from the new volume 212, the old volume 202 transfers the data chunk 3 in a prioritized manner at (6). Once the prioritized transfer is complete and the data chunk 3 is stored in the appropriate partition of the new volume 212, the new volume 212 transmits the data chunk 3 to the virtual machine 335 at (7), which forwards the data chunk 3 to the program 336 at (8) to complete the read operation.

Example Partition-to-Partition Data Chunk Migration

Figure 4A:
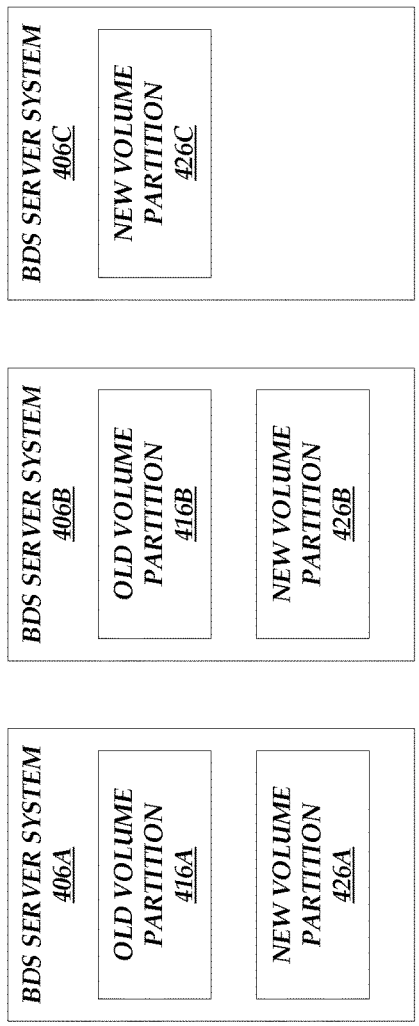
FIG. 4A is a block diagram depicting various block data storage (BDS) server systems in the data volume modification environment of FIG. 1, according to one embodiment.

FIG. 4A is a block diagram depicting various BDS server systems 406A-C in the data volume modification environment of FIG. 1, according to one embodiment. As illustrated in FIG. 4A, BDS server system 406A includes storage devices that store a first partition of an old volume, old volume partition 416A, and a first partition of a new volume, new volume partition 426A; BDS server system 406B includes storage devices that store a second partition of the old volume, old volume partition 416B, and a second partition of the new volume, new volume partition 426B; and BDS server system 406C includes storage devices that store a third partition of the new volume, new volume partition 426C. Thus, the old volume has two partitions and the new volume has three partitions.

Figure 4B:
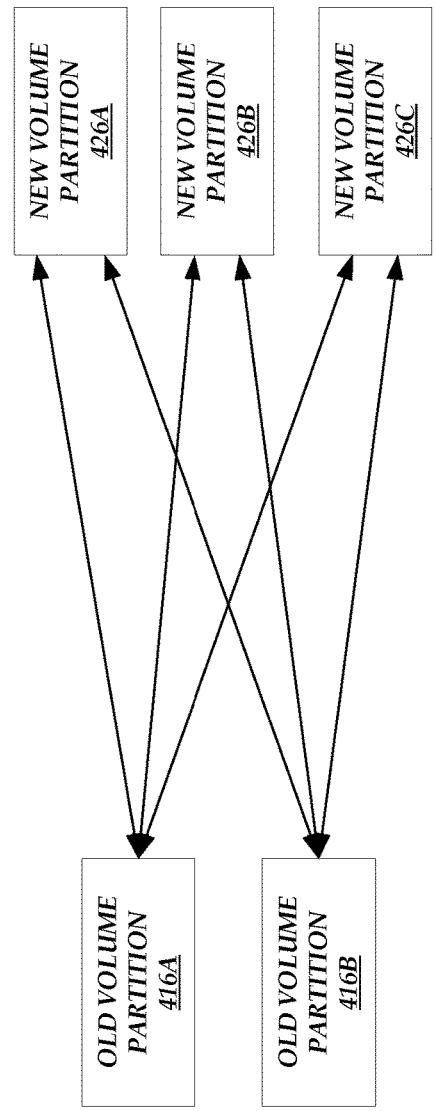
FIG. 4B is a block diagram depicting the communication between various partitions of an old volume partition and a new volume partition, according to one embodiment.

FIG. 4B is a block diagram depicting the communication between various partitions 416A-B and 426A-C of an old volume partition and a new volume partition, according to one embodiment. As illustrated in FIG. 4B, each new volume partition 426A-C can communicate with each old volume partition 416A-B. This may be the case because the old volume and the new volume have a different number of partitions, and thus any given data chunk in the old volume partition 416A or 416B can be stored in one of the new volume partitions 426A-C. For example, this concept is illustrated below with respect to FIG. 4C.

Figure 4C:
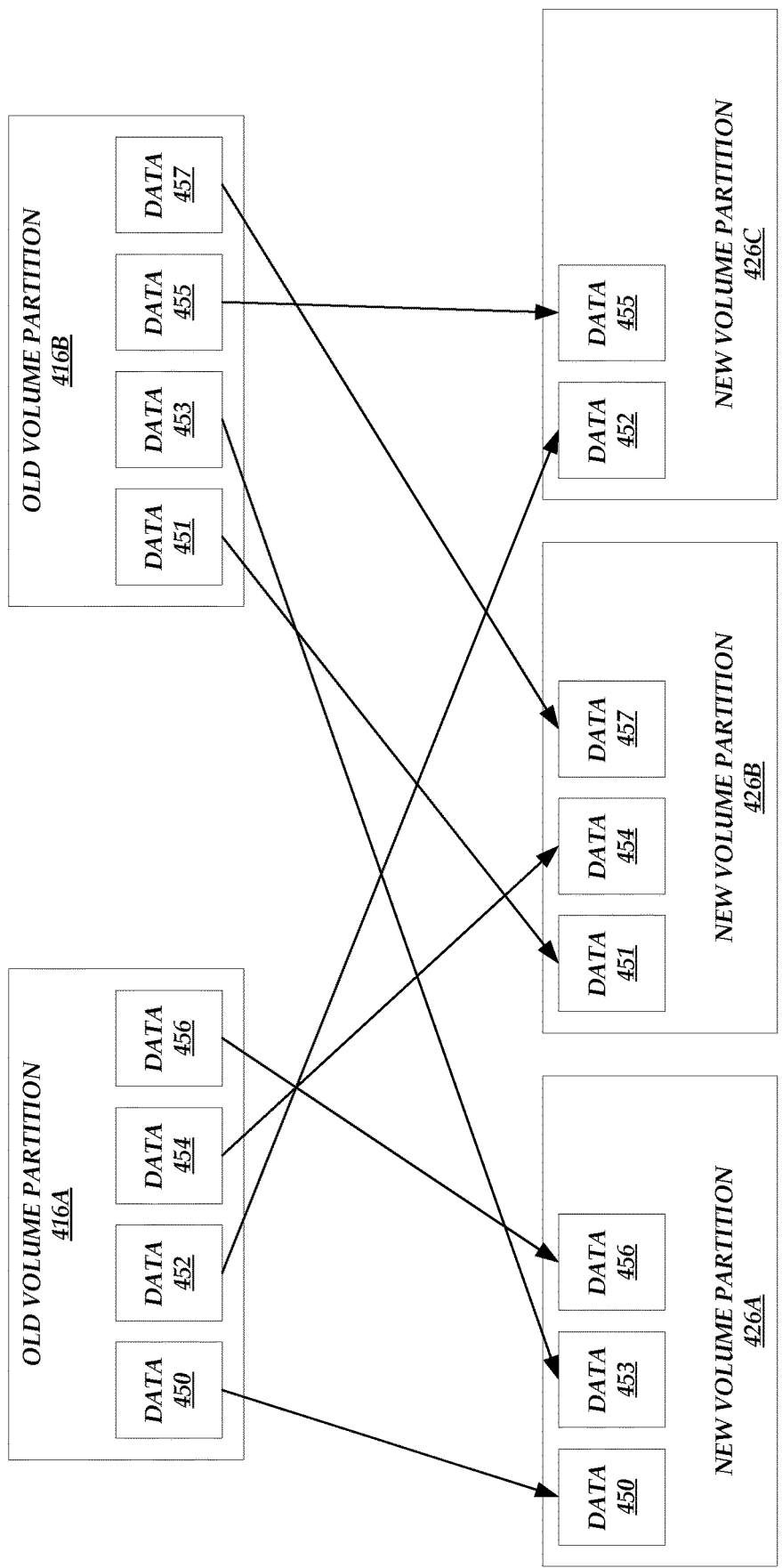
FIG. 4C is a block diagram depicting a correlation of data chunks stored in old volume partitions and new volume partitions, according to one embodiment.

FIG. 4C is a block diagram depicting a correlation of data chunks stored in the old volume partitions 416A-B and the new volume partitions 426A-C, according to one embodiment. As illustrated in FIG. 4C, data chunk 450 is stored in the first data chunk slot of the old volume partition 416A, data chunk 451 is stored in the first data chunk slot of the old volume partition 416B, data chunk 452 is stored in the second data chunk slot of the old volume partition 416A, data chunk 453 is stored in the second data chunk slot of the old volume partition 416B, data chunk 454 is stored in the third data chunk slot of the old volume partition 416A, data chunk 455 is stored in the third data chunk slot of the old volume partition 416B, data chunk 456 is stored in the fourth data chunk slot of the old volume partition 416A, and data chunk 457 is stored in the fourth data chunk slot of the old volume partition 416B.

As described above, because the old volume and the new volume have a different number of partitions, when the data chunks 450-457 are migrated to the new volume, the data chunks 450-457 may not be stored in the same data chunk slot or the same numbered partition. For example, using the techniques described above to determine the location of a data chunk in an old volume and the new location of the data chunk in a new volume, the new volume may store the data chunk 450 in the first data chunk slot of the new volume partition 426A, the data chunk 451 in the first data chunk slot of the new volume partition 426B, the data chunk 452 in the first data chunk slot of the new volume partition 426C, the data chunk 453 in the second data chunk slot of the new volume partition 426A, the data chunk 454 in the second data chunk slot of the new volume partition 426B, the data chunk 455 in the second data chunk slot of the new volume partition 426C, the data chunk 456 in the third data chunk slot of the new volume partition 426A, and the data chunk 457 in the third data chunk slot of the new volume partition 426B.

Example Data Transfer Routine

Figure 5:
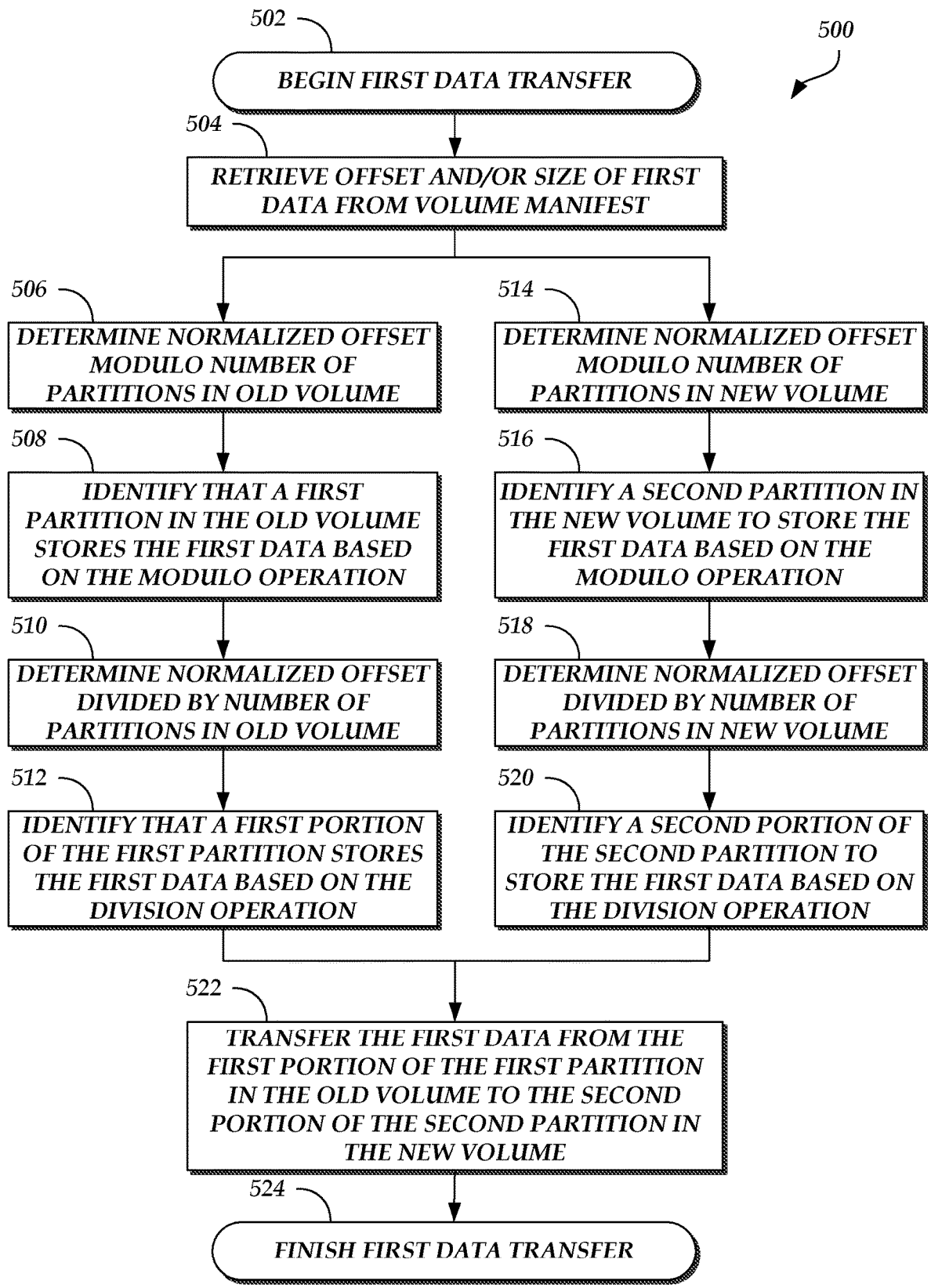
FIG. 5 is a flow diagram depicting a data transfer routine illustratively implemented by a BDS server system, according to one embodiment.

FIG. 5 is a flow diagram depicting a data transfer routine 500 illustratively implemented by a BDS server system, according to one embodiment. As an example, the BDS server system 106 of FIG. 1 can be configured to execute the data chunk transfer routine 500. The data chunk transfer routine 500 begins at block 502.

At block 504, an offset or a size of first data is retrieved from the volume manifest file. For example, the volume manifest file can indicate the offsets where data chunks are stored in an old volume. The volume manifest file may further indicate the size of the data chunks in the old volume. Alternatively, the volume manifest file may not store such information, but such information may be stored locally by the host system 104, the BDS server system 106, or the management system 108. The first data may be a first data chunk.

In some embodiments, a normalized offset is calculated. For example, the offset can be divided by the size of the first data to determine the normalized offset. The normalized offset can be used to determine a partition and data chunk slot where a data chunk is located and a partition and data chunk slot where a data chunk is to be stored. After block 504 is complete, the data chunk transfer routine 500 proceeds to blocks 506 (and blocks 508, 510, and 512) and 514 (and blocks 516, 518, and 520), which can be completed in parallel or sequentially.

At block 506, the normalized offset modulo the number of partitions in the old volume is determined. The result of the modulo operation may be used to identify that a first partition in the old volume stores the first data, as illustrated in block 508.

At block 510, the normalized offset divided by the number of partitions in the old volume is determined. Any remainder resulting from the division operation may be ignored. The result of the division operation may be used to identify that a first portion of the first partition stores the first data, as illustrated in block 512. For example, the first portion may be a first data chunk slot in the first partition of the old volume.

At block 514, the normalized offset modulo the number of partitions in the new volume is determined. The result of the modulo operation may be used to identify that a second partition in the new volume should store the first data, as illustrated in block 516.

At block 518, the normalized offset divided by the number of partitions in the new volume is determined. Any remainder resulting from the division operation may be ignored. The result of the division operation may be used to identify that a second portion of the second partition should store the first data, as illustrated in block 520. For example, the second portion may be a second data chunk slot in the second partition of the new volume.

At block 522, the first data is transferred from the first portion of the first partition in the old volume to the second portion of the second partition in the new volume. After the first data is transferred, the data chunk transfer routine 500 may be complete, as shown in block 524. The data chunk transfer routine 500 may be repeated for each data chunk referenced by an offset in the volume manifest file.

As an example, if the old volume has three partitions, the new volume has four partitions, the data chunks are 8 bits long, and the location of a first data chunk is identified as being at offset 56 in the manifest file, the location of the first data chunk in the old volume and the location for the first data chunk in the new volume can be determined in the following manner. Because the offset is 56 and the data chunks are 8 bits long, the normalized offset is determined by dividing 56 by 8, which results in 7. Determining the normalized offset modulo the number of partitions in the old volume results in 1 (e.g., 7 modulo 3 is 1). Given that the number of partitions in the old volume is 3, possible values resulting from a modulo operation are 0 (e.g., which corresponds with partition 1), 1 (e.g., which corresponds with partition 2), and 2 (e.g., which corresponds with partition 3). Thus, here partition 2 in the old volume includes the first data chunk. Determining the normalized offset divided by the number of partitions in the old volume results in 2 (e.g., 7 divided by 3 is 2 ignoring any remainder values). Given that the number of partitions in the old volume is 3, possible values resulting from a division operation start at 0 (e.g., if the offset is 0, 8, or 16) and therefore a 0 that results from the division operation corresponds to a first data chunk slot in a partition, a 1 that results from the division operation corresponds to a second data chunk slot in a partition, and so on. Thus, here data chunk slot 3 in partition 2 in the old volume includes the first data chunk.

Similarly, determining the normalized offset modulo the number of partitions in the new volume results in 3 (e.g., 7 modulo 4 is 3). Given that the number of partitions in the new volume is 4, possible values resulting from a modulo operation are 0 (e.g., which corresponds with partition 1), 1 (e.g., which corresponds with partition 2), 2 (e.g., which corresponds with partition 3), and 3 (e.g., which corresponds with partition 4). Thus, here partition 4 in the new volume should store the first data chunk. Determining the normalized offset divided by the number of partitions in the new volume results in 1 (e.g., 7 divided by 4 is 1 ignoring any remainder values). Given that the number of partitions in the new volume is 4, possible values resulting from a division operation start at 0 (e.g., if the offset is 0, 8, 16, or 24) and therefore a 0 that results from the division operation corresponds to a first data chunk slot in a partition, a 1 that results from the division operation corresponds to a second data chunk slot in a partition, and so on. Thus, here data chunk slot 2 in partition 4 in the new volume should store the first data chunk.

Example Volume Modification Routine

Figure 6:
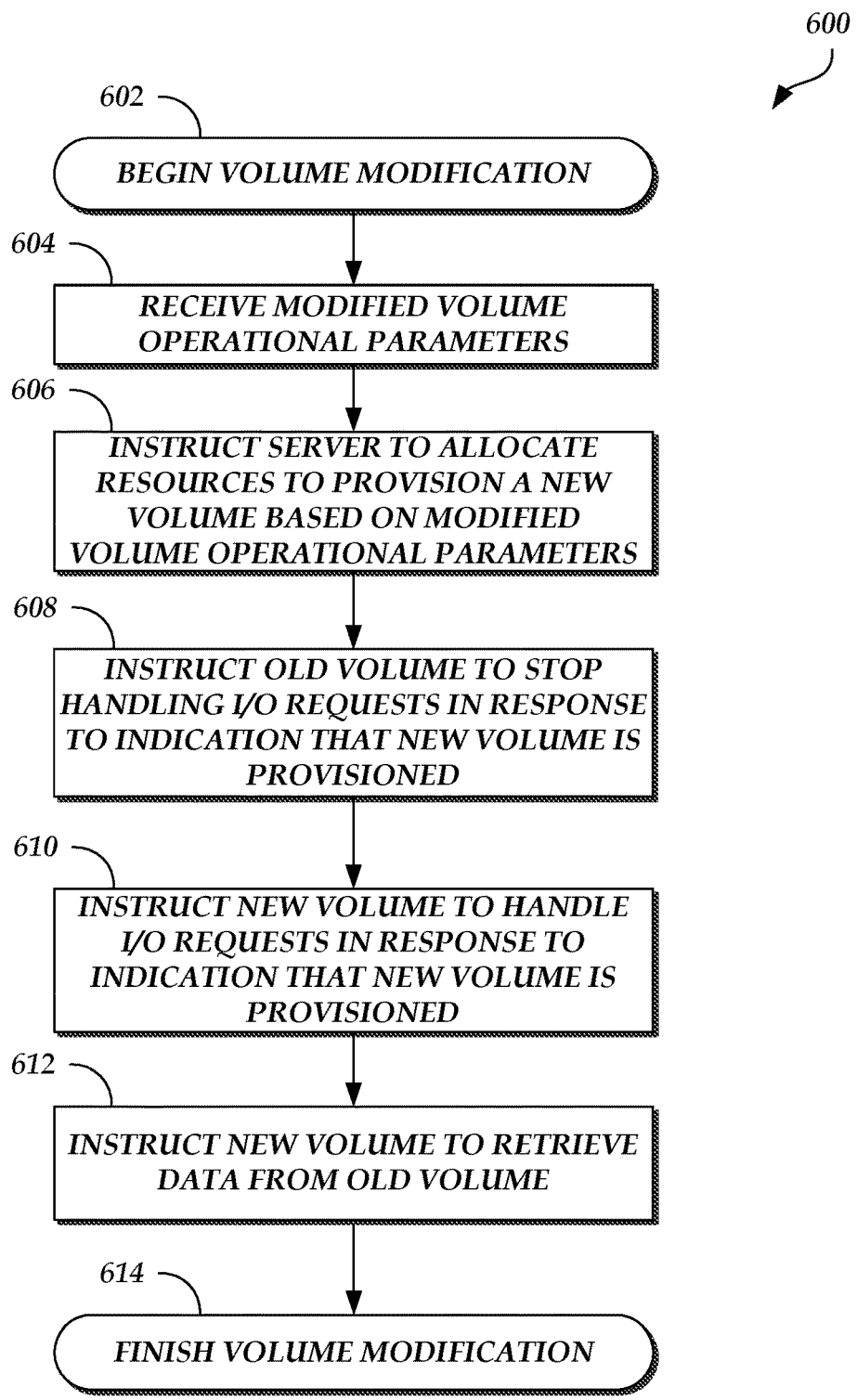
FIG. 6 is flow diagram depicting a volume modification routine illustratively implemented by a management system, according to one embodiment.

FIG. 6 is a flow diagram depicting a volume modification routine 600 illustratively implemented by a management system, according to one embodiment. As an example, the management system 108 (e.g., the volume modification manager 118) of FIG. 1 can be configured to execute the volume modification routine 600. The volume modification routine 600 begins at block 602.

At block 604, modified volume operational parameters are received. For example, the modified volume operational parameters may be received via a "ModifyVolume" API call. The modified volume operational parameters may indicate an increase of a volume storage capacity from a first size to a second size that is larger than the first size.

At block 606, a server is instructed to allocate resources to provision a new volume based on the modified volume operational parameters. For example, the BDS server systems 106 can be instructed to allocate the resources. Thus, in response to receiving a request to increase the storage capacity of an existing volume, a new volume may be provisioned instead of making an adjustment to the existing volume.

At block 608, an old volume is instructed to stop handling I/O requests in response to an indication that the new volume is provisioned. For example, future I/O requests may not be routed to the old volume or the old volume may block any future I/O requests. In an embodiment, the volume modification manager 118 instructs the EBS client (e.g., the virtual machine 135 connected to the BDS server systems 106) to stop sending I/O requests to the old volume. The EBS client then instructs the old volume to stop handling I/O requests and to drain the I/O queue.

At block 610, the new volume is instructed to handle I/O requests in response to an indication that the new volume is provisioned. In an embodiment, the volume modification manager 118 instructs the EBS client to send I/O requests to the new volume. The EBS client then instructs the new volume to start handling I/O requests. Thus, the new volume may handle I/O requests in place of the old volume moving forward.

At block 612, the new volume is instructed to retrieve data from the old volume. For example, the new volume may be so instructed after the new volume begins handling I/O requests in place of the old volume. The data retrieval may occur while the new volume handles I/O requests. The new volume may use a volume manifest file of the old volume to complete the retrieval. In an alternate embodiment, block 612 can be performed before block 610 and after block 608. After the data retrieval begins, the volume modification routine 600 may be complete, as shown in block 614.

Figure 7:
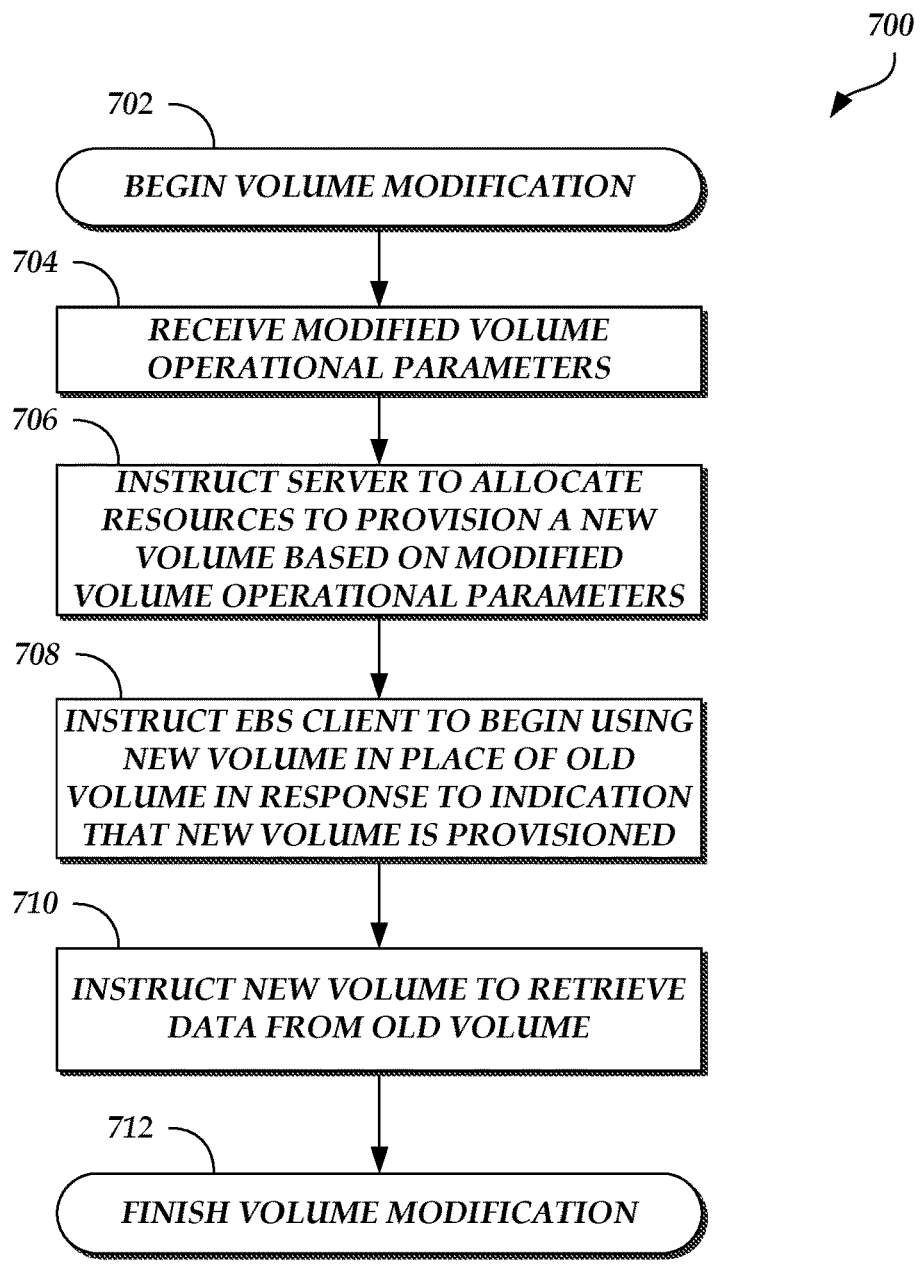
FIG. 7 is a flow diagram depicting a volume modification routine illustratively implemented by a management system, according to one embodiment.

FIG. 7 is a flow diagram depicting a volume modification routine 700 illustratively implemented by a management system, according to one embodiment. As an example, the management system 108 (e.g., the volume modification manager 118) of FIG. 1 can be configured to execute the volume modification routine 700. The volume modification routine 700 begins at block 702.

At block 704, modified volume operational parameters are received. For example, the modified volume operational parameters may be received via a "ModifyVolume" API call. The modified volume operational parameters may indicate an increase of a volume storage capacity from a first size to a second size that is larger than the first size.

At block 706, a server is instructed to allocate resources to provision a new volume based on the modified volume operational parameters. For example, the BDS server systems 106 can be instructed to allocate the resources. Thus, in response to receiving a request to increase the storage capacity of an existing volume, a new volume may be provisioned instead of making an adjustment to the existing volume.

At block 708, an EBS client is instructed to begin using the new volume in place of the old volume in response to an indication that the new volume is provisioned. In an embodiment, the EBS client then instructs the old volume to stop handling I/O requests and to drain the I/O queue and instructs the new volume to start handling I/O requests.

At block 710, the new volume is instructed to retrieve data from the old volume. For example, the new volume may be so instructed after the new volume begins handling I/O requests in place of the old volume. The data retrieval may occur while the new volume handles I/O requests. The new volume may use a volume manifest file of the old volume to complete the retrieval. After the data retrieval begins, the volume modification routine 700 may be complete, as shown in block 712.

Hierarchical Data Volumes

In some embodiments, a hierarchical set of data volumes can be used to handle I/O requests. For example, the data center 140 can receive a second request to modify an initial volume 116 after previously receiving a first request to modify the same initial volume 116 and before the first request is completed. As an example, in response to the first request, a first new volume 116 is provisioned. However, the migration of data chunks from the initial volume 116 to the first new volume 116 may not be complete at the time that the second request is received. In response to receiving the second request, the migration of data chunks from the initial volume 116 to the first new volume 116 may be terminated. In addition, a second new volume 116 may be provisioned according to the second request. Thus, the migration of data chunks from the first new volume 116 to the second new volume 116 may begin.

If a read request arrives from a program 136 after the second new volume 116 is provisioned and begins handling I/O requests, the data chunk corresponding to the read request may be stored in the initial volume 116 only, the first new volume 116 only, both the initial volume 116 and the second new volume 116, or the initial volume 116, and the first new volume 116, and the second new volume 116. If the second new volume 116 determines that the data chunk is not located therein, then the second new volume 116 may request a prioritized retrieval of the data chunk from the first new volume 116 (e.g., using the volume manifest file of the first new volume 116, which may include all offsets in the initial volume 116 and in the first new volume 116). The first new volume 116 may then determine whether the data chunk is located therein. If the data chunk is not located therein, then the first new volume 116 (or the second new volume 116) may request the data chunk from the initial volume 116 (e.g., using the manifest file of the initial volume 116). If the data chunk is stored in the initial volume 116, then the second new volume 116 may initiate a prioritized retrieval of the data chunk from the initial volume 116.

In alternate embodiments, the volume manifest file of each volume 116 may include a differential set of information. For example, the volume manifest file of the initial volume 116 may indicate the offsets of data chunks stored therein. The volume manifest file of the first new volume 116 may indicate just the offsets of the data chunks stored in the first new volume 116 and not stored in the initial volume 116. The second new volume 116 can combine the volume manifest files to identify directly which volume 116 includes the desired data chunk and request the data chunk in a prioritized manner accordingly.

Data Loss

As described herein, volumes 116 can have partitions stored on different BDS server systems 106. Thus, a new volume 116 can be retrieving data chunks from the various partitions of an initial volume 116, where the various partitions on stored on different BDS server systems 106. Accordingly, if a BDS server system 106 storing one of the partitions fails during the data chunk migration process, the entire initial volume 116 is not lost if all of the data chunks from the partition that failed have already been retrieved. The polling performed by the volume modification manager 118 can be used to determine whether all of the data chunks from an initial volume 116 partition have been retrieved, and therefore whether the initial volume 116 is lost. If the initial volume 116 is lost, the user can be notified via a message transmitted to the user device 102 or a message transmitted to an account accessible by the user via the user device 102.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    as implemented by one or more computing devices configured with specific executable instructions, storing a first input/output (I/O) request in an I/O queue;
receiving a request to modify a characteristic of a first data volume so that the first data volume has a modified characteristic;
causing a second data volume to be provisioned that has the modified characteristic;
based at least in part on the second data volume being provisioned,
    causing the second data volume to initiate a data transfer from the first data volume;
    causing the first data volume to cease execution of any future I/O request not yet stored in the I/O queue in response to initiation of the data transfer;
    causing the first data volume to execute the first I/O request subsequent to causing the first data volume to cease execution of any future I/O request not yet stored in the I/O queue;
    causing a future I/O request to be executed on the second data volume in place of the first data volume;
receiving a second request for a first data chunk;
determining that the first data chunk has not been completely transferred to the second data volume from the first data volume; and
causing the second data volume to prioritize transfer of the first data chunk from the first data volume.

2. The computer-implemented method of claim 1, wherein causing the second data volume to prioritize transfer of the first data chunk from the first data volume further comprises causing the second data volume to instruct the first data volume to prioritize the transfer of the first data chunk over a transfer of a second data chunk.

3. The computer-implemented method of claim 2, wherein the first data volume pauses the transfer of the second data chunk to the second data volume and begins transferring the first data chunk to the second data volume in response to the first data volume being instructed to prioritize the transfer of the first data chunk.

4. The computer-implemented method of claim 3, wherein the first data volume resumes the transfer of the second data chunk to the second data volume after the transfer of the first data chunk to the second data volume is complete.

5. The computer-implemented method of claim 2, wherein in response to the first data volume being instructed to prioritize the transfer of the first data chunk,
    the first data volume transfers the second data chunk to the second data volume over a first connection, and wherein the first data volume establishes a new connection for transferring the first data chunk to the second data volume simultaneously with the transfer of the second data chunk to the second data volume.

6. The computer-implemented method of claim 5, wherein at least one of the first data volume or the second data volume allocates more computing resources to the new connection than to the first connection.

7. The computer-implemented method of claim 1, wherein causing the second data volume to prioritize transfer of the first data chunk from the first data volume further comprises causing the second data volume to instruct the first data volume to prioritize the transfer of the first data chunk while the first data chunk is being transferred to the second data volume from the first data volume.

8. A system comprising:
a computing system hosting at least a portion of a first data volume; and
a management system comprising a processor and memory, wherein the memory includes instructions that, when executed by the processor, cause the management system to at least:
    store a first input/output (I/O) request in an I/O queue;
    process a request to modify a characteristic of the first data volume so that the first data volume has a modified characteristic;
    cause a second data volume to be provisioned that has the modified characteristic;
    based at least in part on the second data volume being provisioned,
        cause the second data volume to initiate a data transfer from the first data volume;
        cause the first data volume to cease execution of any future I/O request not yet stored in the I/O queue in response to initiation of the data transfer;
        cause the first data volume to execute the first I/O request subsequent to causing the first data volume to cease execution of any future I/O request not yet stored in the I/O queue;
        cause a future I/O request to be executed on the second data volume in place of the first data volume;
    process a second request for first data;
    determine that the first data has not been completely transferred to the second data volume from the first data volume; and
    cause the second data volume to prioritize transfer of the first data from the first data volume.

9. The system of claim 8, wherein the memory includes further instructions that, when executed by the processor, further cause the management system to at least:
cause the second data volume to instruct the first data volume to prioritize the transfer of the first data over a transfer of second data.

10. The system of claim 9, wherein the first data volume pauses the transfer of the second data to the second data volume and begins transferring the first data to the second data volume in response to the first data volume being instructed to prioritize the transfer of the first data.

11. The system of claim 10, wherein the first data volume resumes the transfer of the second data to the second data volume after the transfer of the first data to the second data volume is complete.

12. The system of claim 9, wherein:
the first data volume transfers the second data to the second data volume over a first connection, and
in response to the first data volume being instructed to prioritize the transfer of the first data, the first data volume establishes a new connection for transferring the first data to the second data volume simultaneously with the transfer of the second data to the second data volume.

13. The system of claim 12, wherein at least one of the first data volume or the second data volume allocates more computing resources to the new connection than to the first connection.

14. The system of claim 8, wherein the memory includes further instructions that, when executed by the processor, further cause the management system to at least:
cause the second data volume to instruct the first data volume to prioritize the transfer of the first data while the first data is being transferred to the second data volume from the first data volume.

15. A non-transitory computer-readable medium storing executable program code that directs one or more computing devices to perform operations, the operations comprising:
- storing a first input/output (I/O) request in an I/O queue;
- processing a request to modify a characteristic of a first storage location so that the first storage location has a modified characteristic;
- causing a second storage location to be formed that has the modified characteristic;
- in response to the second storage location being formed, causing the second storage location to initiate a data transfer from the first storage location;
- causing the first storage location to cease execution of any future I/O request not yet stored in the I/O queue in response to initiation of the data transfer;
- causing the first storage location to execute the first I/O request subsequent to causing the first storage location to cease execution of any future I/O request not yet stored in the I/O queue;
- causing a future I/O request to be executed on the second storage location in place of the first storage location;
- processing a second request for first data;
- determining that the first data has not been completely transferred to the second storage location from the first storage location; and
- causing the second storage location to prioritize transfer of the first data from the first storage location.

16. The non-transitory computer-readable medium of claim 15, wherein the operations further comprise causing the second storage location to instruct the first storage location to prioritize the transfer of the first data over a transfer of second data.

17. The non-transitory computer-readable medium of claim 16, wherein in response to the first storage location being instructed to prioritize the transfer of the first data, the first storage location pauses the transfer of the second data to the second storage location and begins transferring the first data to the second storage location.

18. The non-transitory computer-readable medium of claim 16, wherein:
- the first storage location transfers the second data to the second storage location over a first connection, and
- in response to the first storage location being instructed to prioritize the transfer of the first data, the first storage location establishes a new connection for transferring the first data to the second storage location simultaneously with the transfer of the second data to the second storage location.

19. The non-transitory computer-readable medium of claim 18, wherein at least one of the first storage location or the second storage location allocates more computing resources to the new connection than to the first connection.

20. The non-transitory computer-readable medium of claim 15, wherein the operations further comprise causing the second storage location to instruct the first storage location to prioritize the transfer of the first data while the first data is being transferred to the second storage location from the first storage location.

* * * * *